(12) United States Patent
Lupoli et al.

(10) Patent No.: US 7,388,488 B2
(45) Date of Patent: Jun. 17, 2008

(54) METHOD AND SYSTEM FOR STORING, RETRIEVING, AND MANAGING DATA FOR TAGS

(76) Inventors: Peter Lupoli, 565 Picacho La., Santa Barbara, CA (US) 93108; Jay Kesan, 2420 Nottingham Dr., Champaign, IL (US) 61821

( * ) Notice: Subject to any disclaimer, the term of this patent is extended or adjusted under 35 U.S.C. 154(b) by 49 days.

(21) Appl. No.: 10/952,789

(22) Filed: Sep. 30, 2004

(65) Prior Publication Data

US 2005/0092823 A1    May 5, 2005

Related U.S. Application Data

(60) Provisional application No. 60/515,449, filed on Oct. 30, 2003.

(51) Int. Cl.
*G08B 13/14* (2006.01)

(52) U.S. Cl. .............. 340/572.1; 340/10.1; 340/10.51

(58) Field of Classification Search ............. 340/572.1
See application file for complete search history.

(56) References Cited

U.S. PATENT DOCUMENTS

| | | | |
|---|---|---|---|
| 3,706,094 A | 12/1972 | Cole | 343/6.5 SS |
| 3,752,960 A | 8/1973 | Walton | |
| 4,166,470 A | 9/1979 | Neumann | 128/419 PG |
| 4,399,437 A | 8/1983 | Falck | 340/825.54 |
| 4,404,553 A | 9/1983 | Cuffia | 340/728 |
| 4,514,731 A | 4/1985 | Falck | 340/825.08 |
| 4,600,829 A | 7/1986 | Walton | 235/439 |
| 4,673,932 A | 6/1987 | Ekchian | 340/825.54 |
| 4,714,925 A | 12/1987 | Bartlett | 340/825.55 |
| 4,807,140 A | 2/1989 | Saulnier | 364/468 |
| 4,892,709 A | 1/1990 | Frese | 422/98 |
| 4,952,928 A | 8/1990 | Carroll | 340/825.54 |
| 5,028,918 A | 7/1991 | Giles | 340/825.54 |
| 5,144,298 A | 9/1992 | Henneuse | 340/854.6 |
| 5,186,001 A | 2/1993 | Muntz | 60/515 |
| 5,193,540 A | 3/1993 | Schulman | 128/419 R |
| 5,218,343 A | 6/1993 | Stobbe | 340/572 |
| 5,252,962 A | 10/1993 | Urbas | 340/870.17 |
| 5,266,926 A | 11/1993 | Biegel | |
| 5,347,263 A | 9/1994 | Carroll | 340/572 |
| 5,358,514 A | 10/1994 | Schulman | 607/61 |
| 5,367,878 A | 11/1994 | Muntz | 60/512 |
| 5,423,334 A | 6/1995 | Jordan | 128/899 |
| 5,430,441 A | 7/1995 | Bickley | 340/825.54 |
| 5,446,447 A | 8/1995 | Abels | 340/572 |
| 5,465,082 A | 11/1995 | Chaco | 340/825.54 |
| 5,481,262 A | 1/1996 | Urbas | 340/870.17 |
| 5,568,126 A | 10/1996 | Andersen | 340/574 |
| 5,583,819 A | 12/1996 | Roesner | 365/225.7 |

(Continued)

OTHER PUBLICATIONS

PCT International Search Report, mailed on Aug. 31, 2006.

(Continued)

*Primary Examiner*—George Bugg
(74) *Attorney, Agent, or Firm*—Jones Day

(57) ABSTRACT

This invention relates generally to a method and system for storing, retrieving, and managing data for tags that are associated in some manner to any type of object. More particularly, the present invention writes data to these tags, reads data from these tags, and manages data that is written to and/or read from these tags.

37 Claims, 13 Drawing Sheets

U.S. PATENT DOCUMENTS

| | | | |
|---|---|---|---|
| 5,606,260 A | 2/1997 | Gioedano | 324/339 |
| 5,682,142 A | 10/1997 | Loosmore | 340/572 |
| 5,701,121 A | 12/1997 | Murdoch | 340/825.54 |
| 5,745,034 A | 4/1998 | Andersen | 340/574 |
| 5,834,790 A | 11/1998 | Suzuki | 257/10 |
| 5,839,056 A | 11/1998 | Hakkinen | 455/69 |
| 5,862,803 A | 1/1999 | Besson | 128/696 |
| 5,971,587 A | 10/1999 | Kato | 364/468.22 |
| 6,025,780 A | 2/2000 | Bowers | 340/572.3 |
| 6,107,102 A | 8/2000 | Ferrari | 436/518 |
| 6,152,181 A | 11/2000 | Wapner | 137/807 |
| 6,154,137 A | 11/2000 | Goff | 340/572.4 |
| 6,195,006 B1 | 2/2001 | Bowers | 340/572.1 |
| 6,335,686 B1 | 1/2002 | Goff | 340/572.4 |
| 6,405,066 B1 | 6/2002 | Essenpreis | 600/347 |
| 6,424,262 B2 | 7/2002 | Garber | 340/572.3 |
| 6,440,096 B1 | 8/2002 | Lastovich | 604/27 |
| 6,496,806 B1* | 12/2002 | Horwitz et al. | 705/28 |
| 6,600,420 B2 | 7/2003 | Goff | 340/572.4 |
| 6,615,074 B2 | 9/2003 | Mickle | 600/509 |
| 6,646,554 B1 | 11/2003 | Goff | 340/572.6 |
| 6,747,562 B2 | 6/2004 | Giraldin | 340/573.1 |
| 6,782,381 B2 | 8/2004 | Nelson et al. | |
| 6,900,762 B2 | 5/2005 | Andrews et al. | |
| 6,901,304 B2 | 5/2005 | Swan et al. | |
| 6,933,849 B2 | 8/2005 | Sawyer | |
| 7,180,422 B2 | 2/2007 | Milenkovic et al. | |
| 2002/0070865 A1* | 6/2002 | Lancos et al. | 340/573.1 |
| 2003/0001720 A1 | 1/2003 | Stack | 340/3.5 |
| 2003/0212311 A1 | 11/2003 | Nova | 600/300 |
| 2003/0216625 A1 | 11/2003 | Phipps | 600/300 |
| 2003/0229559 A1 | 12/2003 | Panttaja et al. | |
| 2004/0017300 A1 | 1/2004 | Kotzin | 340/870.11 |
| 2004/0049233 A1 | 3/2004 | Edwards | 607/5 |
| 2004/0077995 A1 | 4/2004 | Ferek-Petric | 604/66 |
| 2004/0080419 A1* | 4/2004 | Martin et al. | 340/573.1 |
| 2004/0122296 A1 | 6/2004 | Hatlestad | 600/300 |
| 2004/0122488 A1 | 6/2004 | Mazar | 607/60 |
| 2004/0122489 A1 | 6/2004 | Mazar | 607/60 |
| 2004/0133086 A1 | 7/2004 | Ciurczak | 600/322 |
| 2004/0133453 A1 | 7/2004 | Jomini | 705/2 |
| 2004/0139048 A1 | 7/2004 | Kerr | 707/1 |
| 2004/0153339 A1 | 8/2004 | Hetzel | 705/2 |
| 2004/0189476 A1* | 9/2004 | Borovoy et al. | 340/573.1 |
| 2005/0099269 A1* | 5/2005 | Diorio et al. | 340/10.51 |
| 2005/0138081 A1 | 6/2005 | Alshab et al. | |
| 2005/0143909 A1 | 6/2005 | Orwant | |
| 2005/0150944 A1 | 7/2005 | Melick et al. | |
| 2005/0165784 A1 | 7/2005 | Gomez et al. | |
| 2005/0193222 A1 | 9/2005 | Greene | |
| 2005/0203888 A1 | 9/2005 | Woolsey et al. | |
| 2005/0209947 A1 | 9/2005 | Shafer | |
| 2005/0210387 A1 | 9/2005 | Alagappan et al. | |

OTHER PUBLICATIONS

PCT Written Opinion of the International Searching Authority mailed on Aug. 31, 2006.
Siemens Offers RTLS Technology. *RFID Journal*, Mar. 13, 2003. URL: http://www.rfidjournal.com/article/articleview/339/1/26/.
Singapore Fights SARS with RFID. *RFID Journal*, Jun. 4, 2003. URL: http://www.rfidjournal.com/article/view/446.
C. Floerkemeier, D. Anarkat, T. Osinski, and M. Harrison. PML Core Specification 1.0. Specification, Auto-ID Center, Oct. 1, 2003.
J. Shanmugasundaram, J. Shanmugasundaram, I. Tatarinov, E. Shekita, E. Shekita, J. Kiernan, and J. Naughton. A General Technique for Querying XML Documents using a Relational Database System. *SIGMOD Record*, 30(3):20-26, 2001.
R. Stapleton-Gray. ONS: Leveraging E-Commerce. *RFID Journal*. URL: http://www.rfidjournal.com/article/articleview/1560/1/164/. Copyright 2002-2005.
Forta—"SAMS Teach Yourself SQL in 10 minutes," 3rd Edition—Table of Contents Only. Apr. 2004.
Forta et al.—"The Macromedia Cold Fusion 5 Web Application Construction Kit," 4th Edition—Chapters: 1, 6, 34, 36. Jul. 2001.
Krishnamurthy et al.—XML-to-SQL Query Translation Literature: The State of the Art and Open Problems. 2003.
RealServer Administration and Content Creation Guide, Version 4.0, Progressive Networks, Inc.1997.
Rumbaugh et al.—"Object Oriented Modeling and Design," Prentice Hall, Inc.—Chapter 1. 1991.
Schneier—"Applied Cryptography," 1996—Chapters: 1, 2, 19, 20.
Silberschatz—"Database System Concepts," McGraw-Hill, Fifth Edition—Chapters: 1, 9. May 2005.
Wall et al.—"Programming Perl," O'Reilly & Associates, Inc., Mar. 1992—Table of Contents Only.
Enge, P. (May 2004). Retooling the Global Positioning System. *Scientific American*, 65-71.
Hiltzik, M. (May 2004). Woz Goes Wireless. *Technology Review*, 44.
Rose, B. (May 17, 2004). Keeping Track. *Santa Barbara News-Press*, B2, B3 and B4.
Want, R. (Jan. 9, 2004). RFID, A Key to Automating Everything. *Scientific American*, 56-65.
Wave the Card for Instant Credit. (Dec. 14, 2003). *Associated Press*.
Casino chips to carry RFID tags. (Jan. 2004). NewScientist.com.
Philipkoski, K. (Nov. 19, 2003). Fedex Delivers New Tech Lab. *Wired News Report*.
Wal-Mart, DOD Forcing RFID. (Nov. 3, 2003). *Wired News Report*.
Collins, J. (Oct. 3, 2003). New ConnecTerra software aims to simplify enterprise-wide RFID deployment, data collection and management. *RFiD Journal*.
French, M. (Oct. 24, 2003). Military releases RFID policy. FCW.com.
Scheeres, J. (Oct. 24, 2003). Three R's: Reading, Writing, RFID. *Wired News*.

* cited by examiner

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
.
Tag ID (byte n-1)
Current Time (byte 0)
Current Time (byte 1)
Current Time (byte 2)
Current Time (byte 3)
RSA Signature (byte 0)
.
.
.
RSA Signature (byte 15)

*Fig. 6A*

Network Packet Format for Central Authority Broadcast

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
RSA Signature (byte 0)
.
.
.
RSA Signature (byte 15)

*Fig. 6B*

Network Packet Format for Tag-ID-Map Broadcast

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
Number of Entries (=m) (byte 0)
Number of Entries (byte 1)
Number of Entries (byte 2)
Number of Entries (byte 3)
Entry #1
Tag ID Length (=$n_1$)
Tag ID (byte 0)
.
.
.
Tag ID (byte $n_1$-1)
Number of Encounters (byte 0)
Number of Encounters (byte 1)
Number of Encounters (byte 2)
Number of Encounters (byte 3)
Tag ID Length (=$n_m$)
Tag ID (byte 0)
.
.
.
Tag ID (byte $n_m$-1)
Number of Encounters (byte 0)
Number of Encounters (byte 1)
Number of Encounters (byte 2)
Number of Encounters (byte 3)
RSA Signature (byte 0)
.
.
.
RSA Signature (byte 15)

*Fig. 6C*

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
.
Tag ID (byte n-1)
Current Time (byte 0)
Current Time (byte 1)
Current Time (byte 2)
Current Time (byte 3)
RSA Signature (byte 0)
.
.
.
RSA Signature (byte 15)

*Fig. 8A*

Network Packet Format for Control-Authority Broadcast (Enable or Disable)

Protocol ID (byte 0)
Protocol ID (byte 1)
Protocol ID (byte 2)
Protocol ID (byte 3)
Current Time (byte 0)
Current Time (byte 1)
Current Time (byte 2)
Current Time (byte 3)
RSA Signature (byte 0)
.
.
.
RSA Signature (byte 15)

*Fig. 8B*

Network Packet Format for Tag-ID Broadcast

Protocol ID (byte 0)
Protocol ID (byte 1)
Protocol ID (byte 2)
Protocol ID (byte 3)
Tag ID Length (=n)
Tag ID (byte 0)
.
.
.
Tag ID (byte n-1)
Current Time (byte 0)
Current Time (byte 1)
Current Time (byte 2)
Current Time (byte 3)
RSA Signature (byte 0)
.
.
.
RSA Signature (byte 15)

*Fig. 10A*

Network Packet Format for Control-Authority Add Tag

Protocol ID (byte 0)
Protocol ID (byte 1)
Protocol ID (byte 2)
Protocol ID (byte 3)
Target Tag ID Length (=n)
Target Tag ID (byte 0)
.
.
.
Target Tag ID (byte n-1)
Sensitive Tag ID Length (=m)
Sensitive Tag ID (byte 0)
.
.
.
Sensitive Tag ID (byte m-1)
Sensitive Tag Public RSA Key (byte 0)
.
.
.
Sensitive Tag Public RSA Key (byte 15)
Current Time (byte 0)
Current Time (byte 1)
Current Time (byte 2)
Current Time (byte 3)
RSA Signature (byte 0)
.
.
.
RSA Signature (byte 15)

*Fig. 10B*

Network Packet Format for Control-Authority Delete Tag

Protocol ID (byte 0)
Protocol ID (byte 1)
Protocol ID (byte 2)
Protocol ID (byte 3)
Target Tag ID Length (=n)
Target Tag ID (byte 0)
.
.
.
Target Tag ID (byte n-1)
Sensitive Tag ID Length (=m)
Sensitive Tag ID (byte 0)
.
.
.
Sensitive Tag ID (byte m-1)
Current Time (byte 0)
Current Time (byte 1)
Current Time (byte 2)
Current Time (byte 3)
RSA Signature (byte 0)
.
.
.
RSA Signature (byte 15)

*Fig. 10C*

METHOD AND SYSTEM FOR STORING, RETRIEVING, AND MANAGING DATA FOR TAGS

RELATED APPLICATION

This application claims the benefit of U.S. Provisional Application No. 60/515,449, filed on Oct. 30, 2003, the entire teachings of which are herein incorporated by reference.

FIELD OF THE INVENTION

This invention relates generally to a method and system for storing, retrieving, and managing data for tags that are associated in some manner to any type of object. More particularly, the present invention writes data to these tags, reads data from these tags, and manages data that is written to and/or read from these tags.

BACKGROUND

This invention involves a method and system for storing, retrieving, and managing data for any type of tag that is associated in any type of manner to any type of object, physical or abstract, animate or inanimate. A tag is any device that sends, receives and/or stores data about whatever it is monitoring or associated with; it includes many different types such as radio frequency identification device (RFID) tags, laser tags, cellular phones, devices that receive and transmit signals from television networks, any type of satellite communication network such as a Global Positioning System (GPS), etc. A tag may be powered by any type of power source such as a DC power source, an AC power source, solar, etc. Identification devices are further described in U.S. Pat. No. 3,752,960 to Charles Walton, entitled, "Electronic Identification & Recognition System," the contents of which are herein incorporated by reference. The types of objects that may be associated with tags include but are not limited to people, animals, plants, things of any kind, real property such as houses, lots, condominiums, mobile homes and townhouses, valuable items such as paintings, diamonds, jewelry, watches, and antiques, movable items such as automobiles, airplanes, military vehicles, bicycles, motorcycles, boats, ships, components thereof, locations, environmental conditions, abstractions, concepts, phenomena, etc. Associations between tags and objects can be of any type including but not limited to one-to-many, many-to-one or one-to-one, physical, logical, etc. Physical associations may include attaching and/or inserting the tag to its associated object.

The present invention is adapted for a wide variety of uses. For example, the method and system of the present invention may be used to authenticate valuable items, to manage inventory such as the tracking of objects of any kind through manufacturing, supply chain, distribution, etc. to the point of sale and beyond, to track the movements of objects such as people, animals, plants, movable items, etc., to retrieve historical data such as price histories from things such as valuable items and real property, to retrieve any type of health data such as medical conditions, treatment history, medication instructions, etc. from people and animals, to track any type of health conditions such as heart rate, pulse rate, temperature, the amount of different things in the blood such as oxygen, sugar, etc. for people and animals.

Many different benefits may arise from the various uses of the present invention. For example, its use may decrease the costs of determining the value of a thing such as a valuable item because, for instance, the price history and other similar data for that item could be easily stored and retrieved from its associated tag. The availability of price history from a tag associated with a house as well as that from other houses in the same neighborhood may prevent a seller from charging an excessively high value to a buyer with little or no knowledge of the actual value of the house. Use of the present invention may prevent the fraudulent substitution of a counterfeit for a valuable item because identification data from the item's associated tag could be used to verify that item's authenticity. Use of the present invention may prevent a car owner from passing off a damaged car as an undamaged one to an unsuspecting buyer because a car's accident history could be stored and retrieved from the car's associated tag. Use of the present invention could prevent the theft of military secrets because clearance information could be easily accessed from the tag associated with a person to determine whether that person should have access to such secrets. Use of the present invention may avoid injury or even death to athletes that may occur while they are performing because their heart rate, temperature, and other medical conditions could be easily monitored. For similar reasons, a coach could use the present invention to quickly determine which players are too fatigued to be effective; an athletic recruiter could use the present invention to determine which players are better able to handle the rigors of competition; and athletic trainers could use the present invention to tailor training programs to particular athletes. Use of the present invention may ease the authentication of evidence at trial because chain of custody could be easily retrieved from the evidence's associated tag at trial. Use of the present invention will further automate and simplify the management of inventory.

Tags and similar devices have been disclosed in other references but no prior art reference discloses the use of such tags in a system and method for storing, retrieving and managing data for a variety of applications including authentication, tracking, health care monitoring, health care management, knowledge acquisition, etc. In contrast, for example, U.S. Pat. Nos. 6,440,096, 5,358,514, 5,193,540, 6,107,102, and 6,405,066 discuss the implantation of microdevices in people. U.S. Pat. Nos. 5,606,260, 4,892, 709, 5,367,878, 6,152,181, 5,834,790, 5,186,001, 5,839,056, and 5,144,298 discuss the use of microdevices as sensors or controllers.

Accordingly, there exists a need for a system and method for storing, retrieving, and managing data for any type of tag that is associated in any type of manner to any type of object.

SUMMARY OF THE INVENTION

The invention provides a system and method for storing, retrieving, and managing data for any type of tag that is associated in any type of manner to any type of object for a variety of applications.

In particular, it is an aspect of the present invention to present a system for storing, retrieving and managing data for one or more objects comprising:

one or more tags associated with the one or more objects;

one or more components communicating with at least one of said tags;

at least one receiver for receiving control data and information data from at least one of said components into at least one of said tags wherein said information data is about the object that is associated with said at least one tag;

at least one transmitter for transmitting at least a portion of said information data to at least one of said components in accordance with said control data; and at least one communication network for facilitating said communicating among said components and said tags;

wherein at least one of said components transmits at least one query to receive at least a portion of said information data about said object associated with said at least one tag.

It is a further aspect of the present invention to present a method for storing, retrieving, and managing data for one or more objects comprising the steps of:

associating one or more tags with the one or more objects;

communicating with at least one of said tags from one or more components;

receiving control data and information data from at least one of said components into at least one of said tags wherein said information data is about the object that is associated with said at least one tag;

transmitting at least a portion of said information data from said at least one tag to at least one of said components in accordance with said control data; and transmitting from said at least one of said components at least one query to receive at least a portion of said information data about said object associated with said at least one tag.

It is a further aspect of the present invention to present a method for managing children comprising the steps of:

associating one or more tags with the one or more children;

transmitting control data and information data to said one or more tags;

receiving said information data into said one or more tags, said information data concerning one or more of the following: the identity of people that came into contact with the one or more children; at least one measurement of at least one environmental condition to which the one or more children was exposed, the academic performance of the one or more children, the athletic performance of the one or more children, at least one measurement of the medical condition of the one or more children; and transmitting at least a portion of said information data from said at least one tag in accordance with said control data.

BRIEF DESCRIPTION OF THE DRAWINGS

These and other aspects and features of the invention will be more clearly understood from the following detailed description along with the accompanying drawing figures, wherein:

FIGS. 6a, 6b, and 6c show exemplary formats of the tag-identifier broadcast, the central authority broadcast and the tag identifier map broadcast respectively.

FIGS. 8a and 8b show exemplary formats of the tag identifier broadcast and the control authority enable/disable respectively.

FIGS. 10a, 10b, and 10c show exemplary formats of the tag-identifier broadcast, the control authority add tag broadcast and the control authority delete tag broadcast respectively.

DETAILED DESCRIPTION OF THE PREFERRED EMBODIMENT

The invention provides a system and method for storing, retrieving, and managing data for any type of tag that is associated in any type of manner to any type of object (physical or abstract, animate or inanimate) for a variety of applications.

While the present invention will be explained within the context of several different applications such as the authentication of objects including valuable items and evidence, and the monitoring of children by their parents, the present invention can be applied to any application which would benefit from the storage, retrieval and management of data for tags that are associated with any kind of object. These applications include the exchange of objects such as real property, goods, and service, monitoring the vital signs of the ill, the elderly and athletes, athletic training programs, monitoring environmental conditions, traffic, and consumer behavior in various settings such as amusement parks, shopping centers, casinos, tracking the location of people such as prisoners, students, foreigners, military personnel, and workers in classified areas, tracking the location of goods of any type such as inventory from manufacturing, the supply chain, distribution, etc. to the point of sale and beyond, tracking the location of classified material, tracking the manufacturing, sale and repair histories of goods such as machinery, cars, airplanes, trains, and components thereof, monitoring movement of people and things such as vehicles, traffic, etc. at locations such as a battlefield, a highway, etc., monitoring the flow of oil and other fluids in pipelines, etc.

Figure 1:
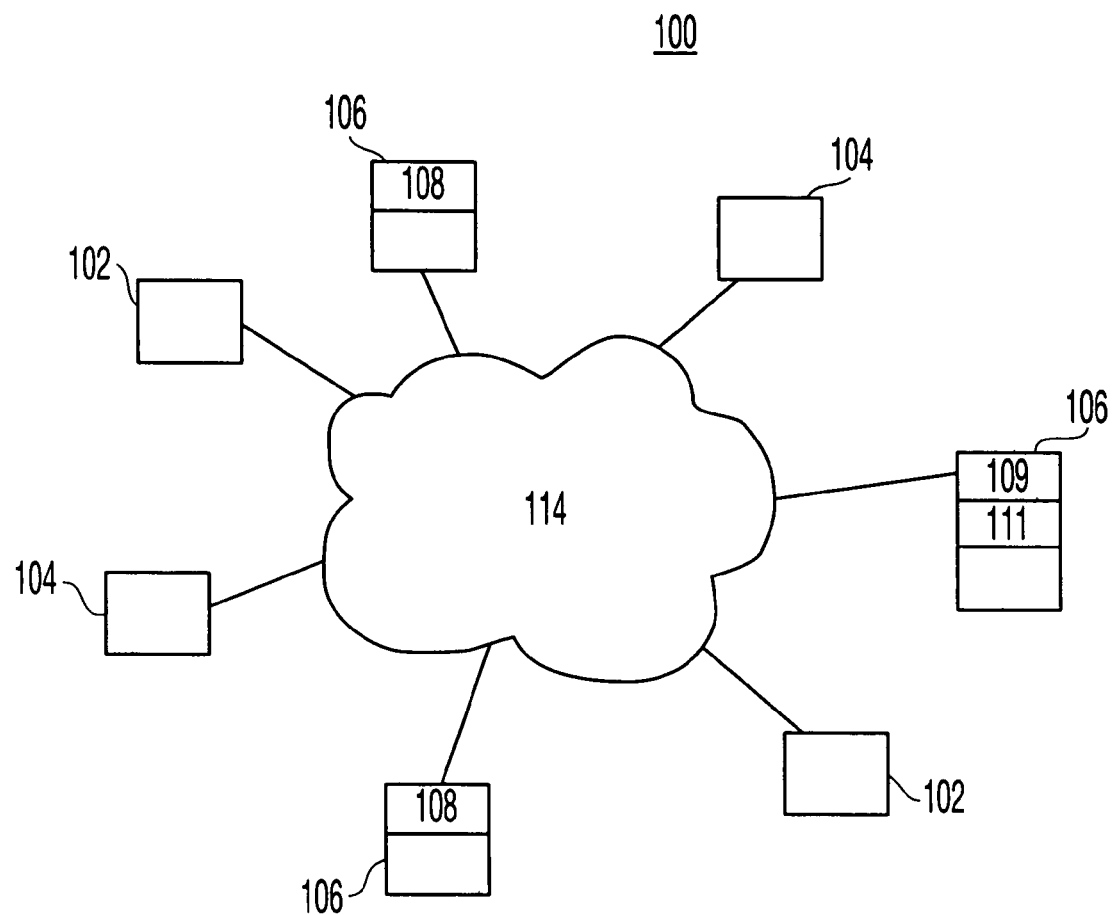
FIG. 1 is a block diagram showing the major operational elements of the invention.

FIG. 1 is a block diagram 100 showing the major operational elements of the invention. The invention may include one or more tags 102 that may be associated with objects of any type including people, animals, plants, things of any kind, real property such as houses, lots, condominiums, mobile homes and townhouses, valuable items such as paintings, diamonds, jewelry, watches, and antiques, vehicles such as automobiles, airplanes, military vehicles, bicycles, motorcycles, boats, ships, components, locations, environmental conditions, abstractions, concepts, phenomena, etc. Associations between tags and objects can be of any type including one-to-many, many-to-one or one-to-one. These associations may be physical, logical, etc. Physical associations may include attaching and/or inserting the tag to or in its associated object. Logical associations may include information in a database such as a table that may establish a correspondence between one or more tags and one or more objects by their identification numbers.

The tags 102 may be one of a variety of a different types including Radio Frequency Identification Device (RFID) tags, laser tags, cellular phones, devices that receive and transmit signals from a Global Positioning System (GPS), etc. The tags 102 may be powered by any kind of power source such as a DC power source, an AC power source, solar power, etc. Each tag 102 may have the ability to receive data, store data, sense data and/or transmit data. Data may be received and transmitted to other tags 102, sensors 104, computers 106, and database management systems 110. The tags 102 may have the ability to sense data from its associated object, its environment, etc. Data sensed from an associated object such as a person or animal may include medical data such as temperature, oxygen content in the blood, heart rate, etc. Data sensed from the environment may include the content of various gases, poisons, and pollutants in the air or water, the temperature, the humidity, barometric pressure, chemicals, motion, light, sound, etc.

The present invention 100 may further include sensors 104. Sensors 104 may be of any type and may sense any kind of data. Sensors 104 may be powered by any type of power source such as an AC power source, a DC power source, solar power, etc. Sensors 104 may include thermometers, motion detectors, Global Positioning System (GPS) devices, chemical sensors, etc. Computers 106 may include database management systems 110 for the storage and management of data associated with tags 102 in any way including data transmitted to and/or retrieved from the tags 102. Data may be transmitted to tags 102 from computers 106 for storage within the tags 102 and may be transmitted from the tags 102 to computers 106. Data retrieved from tags 102 may be stored and managed in database management system 110.

The present invention may further include a communication network 114, which may include a variety of different types of components and software to communicate different types of data among the tags 102, sensors 104, computers 106, etc. These components and software may include modulator/demodulators (modems), satellites, up and down frequency converters including those for communications with the satellites, audio/video encoders, routers, hubs, bridges, etc. In one embodiment, the communication network 114 may be a cellular telephone network. In another embodiment, the communication network 114 may be any type of satellite network such as GPS. In another embodiment, the communication network may be a television network. In another embodiment, the communication network 114 may include the Internet. Communication may be accomplished on the Internet by one or more internet applications, including the World Wide Web. Communication network 114 may be an intranet or an extranet. An intranet is a private network typically a local area network (LAN) or a wide area network (WAN) that enables the use of Internet-based applications in a secure, private environment. Extranets are intranet-type networks that link multiple sites or organizations using intranet related technologies.

The World Wide Web is built on a protocol called the Hypertext Transport Protocol (HTTP). Computers 106 may include browser software 108 for requesting data input by tags 104 and sensors 102, and/or data stored in a database management system 110. Requests for data from browser software 108 may be handled by server software 109. The server software 109 may locate the requested data and may transmit it to the requesting browser software 108. Computers 106 may further include application server software 111, which may extend the capabilities of the server software 109. In particular, the application server software 111 may pre-process a page of data before it is sent to the requesting browser software 108.

In one embodiment, the application server software 111 is a Cold Fusion application. Cold Fusion is a World Wide Web application for creating dynamic page applications and interactive Web sites by combining standard Hypertext Markup Language (HTML) files with Cold Fusion Markup Language (CFML) instructions, as specified in "The Macromedia Cold Fusion 5 Web Application Construction Kit," Ben Forta and Nate Weiss, Fourth Edition, (hereinafter, "Cold Fusion 5"), Chapter 1, the contents of which are herein incorporated by reference. HTML is a page markup language that enables the creation and layout of pages and forms. In one embodiment of the present invention, a Cold Fusion application defines fill-out forms for entry of data including the data to control the operation of the tags 102 and sensors 104 and queries for data.

In one embodiment, a Cold Fusion application 111 is used to retrieve or update data in the database management system 110. The Cold Fusion application 111 may access the database management system 110 through an interface called Open Database Connectivity (ODBC), which is a standard Application Programming Interface (API) for accessing information from different database systems and different formats, as explained in ColdFusion 5, Chapter 6, the contents of which are herein incorporated by reference.

In an alternate embodiment, data may be input using a program written in a language that manipulates text, files and information. An exemplary language is PERL as specified in "Programming Perl," Larry Ward and Randal L. Schwartz, O'Reilly & Associates, Inc., March 1992, the contents of which are herein incorporated by reference.

The database 110 may be a distributed database, which may be stored among many computers 106 or may be a central database. Database 110 may be of any type including a relational database or a hierarchical database. Databases and database management systems are described in Database System Concepts, Henry F. Korth, Abraham Silberschatz, McGraw-Hill 1986, Chapter 1, the contents of which are herein incorporated by reference. Exemplary databases 110 include: Microsoft Structured Query Language (SQL) Server, Microsoft Access 1.0, 2.0 and 7.0, Microsoft FoxPro 2.0, 2.5 and 2.6, Oracle 7.0, Borland Paradox 3.X and 4.X, Borland dBase III and dBase IV, and Microsoft Excel 3.0, 4.0 and 5.0.

In one embodiment, data is retrieved, inserted, updated or deleted from database 110 using Structured Query Language (SQL). SQL is described in "SAMS Teach Yourself SQL," $2^{nd}$ Edition, Ben Forta, the contents of which are herein incorporated by reference.

The present invention may include additional components to manage the data received from tags 102, sensors 104 and elsewhere. These additional components may include a search tool. In one embodiment, the search tool is Verity. Data may be organized into one or more collections. Verity may then be used to index the collection and compile metadata about the collection to enable it to search the collection quickly. Conceptually, Verity's usefulness is attributed to its ability to index and compile information about the collection and use this information to quickly search the collection when asked to do so. Searches and queries may be specified using Verity operators including concept operators such as STEM, WORD, and WILDCARD, proximity operators such as NEAR and PHRASE, relation operators such as CONTAINS, MATCHES, STARTS, ENDS and SUBSTRING, search modifiers such as CASE, MANY, NOT, and ORDER and score operators such as YES NO, COMPLEMENT, PRODUCT, and SUM. Search forms and search results pages may be defined using HTML with Cold Fusion tags. The creation and searching of collections, and the display of search results using Verity is described in ColdFusion 5, Chapter 36, the contents of which are herein incorporated by reference. Web Browser software 108 may display the web pages from the server software 109 including the fill-out form for data input, the fill-out form for input of search criteria and the search results text data. The present invention may also display audio and video data input by tags 102 and sensors 104 using an on-demand video and audio streaming server, such as RealServer as explained in "RealServer Administration and Content Creation Guide", the contents of which are herein incorporated by reference.

In another embodiment, the search engine may be a commercial search engine such as Alta Vista, Google, Yahoo, etc. A commercial search engine may be integrated into the present invention using Cold Fusion tags as explained in ColdFusion 5, Chapter 36.

Before performing the search, the search engine may optimize the queries as specified in Database System Concepts, Henry F Korth, Abraham Silberschatz, McGraw-Hill 1986, Chapter 9, the contents of which are herein incorporated by reference.

Figure 2:
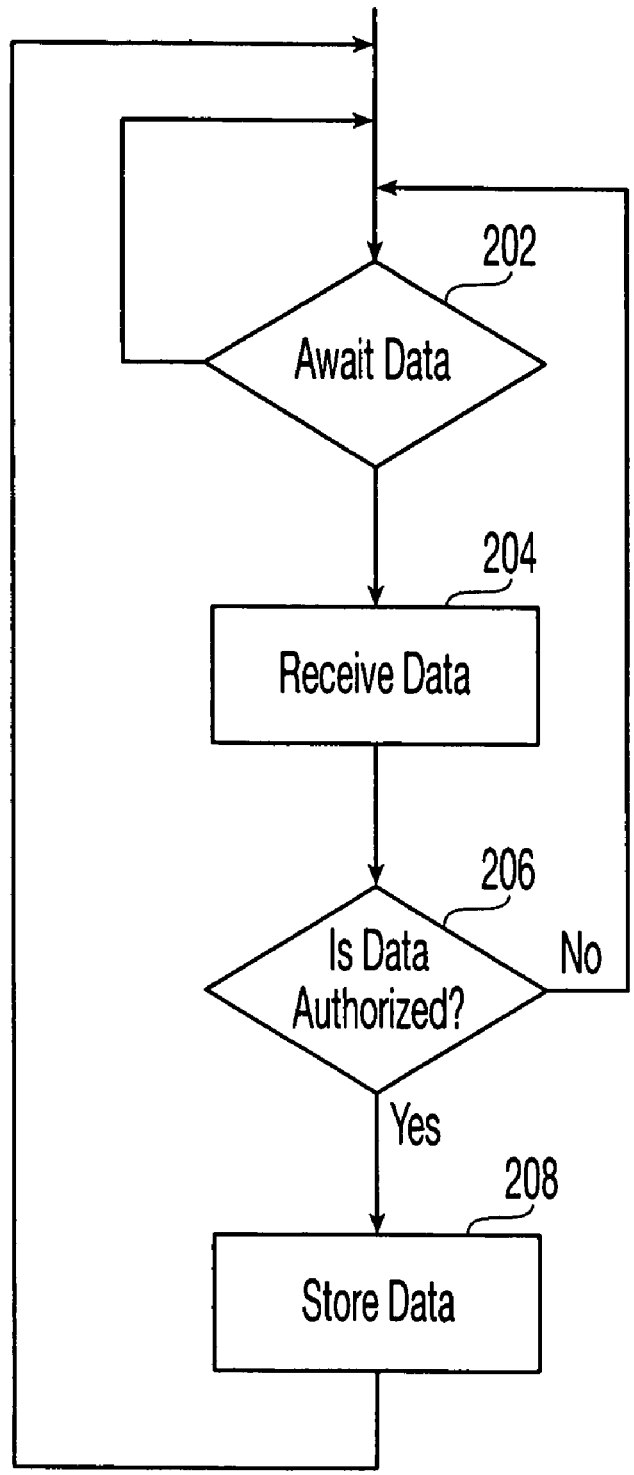
FIG. 2 is a dataflow diagram describing the storage of data to tags 102 that are associated with any kind of object.

FIG. 2 is a dataflow diagram 200 describing the storage of data to tags 102 that are associated with any kind of object. A dataflow diagram is a graph whose nodes are processes and whose arcs are dataflows. See *Object Oriented Modeling and Design*, Rumbaugh, J., Prentice Hall, Inc. (1991), Chapter 1, the contents of which are herein incorporated by reference. The data may consists of control data that governs the operation of the tag 102 such as by defining what types of data the tag 102 is authorized to receive and/or transmit, the identification of those components (i.e., other tags 102, computers 106, browser software 108, server software 109, sensors 104, etc.) that may transmit data to or receive data from the tag 102, and may consists of information for storage within the tag 102. In step 202, the tag 102 may await the receipt of data. Control proceeds to step 204 when data is received. In step 204, the tag 102 may receive data, which may have been transmitted from any type of component including but not limited to a computer 106, browser software 108, server software 109, a database 110, a sensor 104, another tag 102, itself, etc. In step 206, a check may be done to determine whether or not the received data is authorized to be stored in the tag 102. Step 206 may including checking whether the source of the data has the authority to store the type of data that was received at the tag 102.

The checking may be performed by a variety of different techniques including but not limited to those using cryptography, the art and science of keeping messages secure, and any other type of secure communication including an intranet, a virtual private network (VPN), etc. Cryptography may be used in the present invention for authentication, integrity and/or non-repudiation. Authentication enables a receiver of a message to ascertain its origin. Integrity enables a receiver of a message to verify that the message has not been modified in transit. Non-repudiation prevents a sender of a message from falsely denying that it did indeed send the message.

In one embodiment, a symmetric algorithm is used. With symmetric algorithms, the encryption key can be calculated from the decryption key and vice versa. The key must remain secret to keep the communication secret. In another embodiment, a public key algorithm (also called asymmetric algorithm) is used. With a public key algorithm, the decryption key cannot be computed from the encryption key in a reasonable amount of time. The encryption key is made public and is called the public key. The decryption key is kept secret and is called the private key. In another embodiment, digital signatures may be used. With digital signatures, a message is encrypted with a private key by a sender, thereby signing the message and decrypted with a public key by the recipient, thereby verifying the signature. Exemplary digital signature algorithms include Rivest-Shamir-Adelman (RSA) and the Digital Signature Algorithm (DSA) proposed by the National Institute of Standards and Technology (NIST). Cryptography, including symmetric algorithms, public-key algorithms and digital signatures are described in "Applied Cryptography" by Bruce Schneier, Chapters 1, 2, 19 and 20, the contents of which are herein incorporated by reference.

In another embodiment, the checking may be done by some form of password verification.

If the check in step 206 indicates that the received data is authorized to be stored in the tag 102, then control proceeds to step 208. In step 208, the data is stored in the tag 102. After step 208, control proceeds to step 202, where the tag 102 waits for the receipt of new data. If the check in step 206 indicates that the received data is not authorized to be stored in the tag 102, then control returns to step 202.

FIG. 3 is a dataflow diagram 300 describing the transmission of data from tags 102. In step 302, a check is performed to determine whether the tag 102 should be transmitting data without solicitation and if so, what type of data it should be transmitting. This may be done by checking control settings within the tag 102. If the check in step 302 indicates that the tag 102 should be transmitting data, control proceeds to step 304. In step 304, a check is performed to determine whether the data should be transmitted at that time. This check can be done by comparing a clock in the tag 102 to a predetermined time setting. If the check in step 304 indicates that data should be transmitted, then control proceeds to step 308. Otherwise, control remains in step 304. In step 308, the data is transmitted from the tag 102. After step 308, control returns to step 302.

In step 310, the tag 102 awaits a request for data. Control remains in step 310 until such a request is received after which it proceeds to step 312. In step 312, the tag 102 may receive the request, which may have been transmitted from any type of component including but not limited to a client 106, a server 108, a database 110, a sensor 104, another tag 102, etc. In step 312, a check may be done to determine whether or not the received request is authorized to receive a response in the tag 102. Step 312 may include checking whether the source of the request has the authority to receive the type of data that is requested. The checking may be performed by a variety of different techniques including those using cryptography, as explained in detail above. The checking may alternatively be done by some form of password verification. If the check in step 312 indicates that the request is authorized to receive data in response, then control proceeds to step 314. In step 314, the requested data is transmitted to the source of the request. After step 314, control proceeds to step 310, where the tag 102 waits for the receipt of a new request. If the check in step 312 indicates that the request is not authorized to receive data in response, then control returns to step 310.

In one embodiment, communication between one or more of the tags 102 and one or more of the sensors 104 with the server software 109 may be performed using a Wireless Application Protocol (WAP), which is described in ColdFusion 5, Chapter 34, the contents of which are incorporated by reference.

The present invention may have many different uses. For example, it could be used by parents to monitor their children's activities. A parent may associate a tag 102 to a child by any means such as by physically attaching or implanting the tag 102 on the child. From browser software 108 or elsewhere, a parent may transmit control data to the child's tag 102 to indicate that the tag 102 should accept data from other tags 102 associated with particular people, sensors 104 such as global positioning system (GPS) satellites identifying the child's location throughout the day or environmental sensors 104 identifying the content of the air or water (i.e, toxins) to which the child is exposed. The tag 102 on the child executes the process for the storage of data in tags 102 illustrated by the flow diagram of FIG. 2 in order to analyze and store the control information sent by the parent. At a subsequent time, the parent may transmit one or more queries from browser software 108 or elsewhere to learn the identity of the people that came into contact with the child, to retrieve test scores or notes from a teacher that the child may have received that day, the quality of the air and water to which the child was exposed and the child's movements. The tag 102 associated with the child executes the process for transmitting data from the child's tag 102 illustrated by the flow diagram of FIG. 3 in order to respond to the parent's query.

The parent may, in the alternative, transmit additional control data to the child's tag 102 from browser software 108 or elsewhere instructing the child's tag to periodically transmit data from the tag 102 to a database 110. At any subsequent time, the parent may transmit one or more queries from browser software 108 or elsewhere to a database 110 to learn the same information about the child.

Figure 4A:
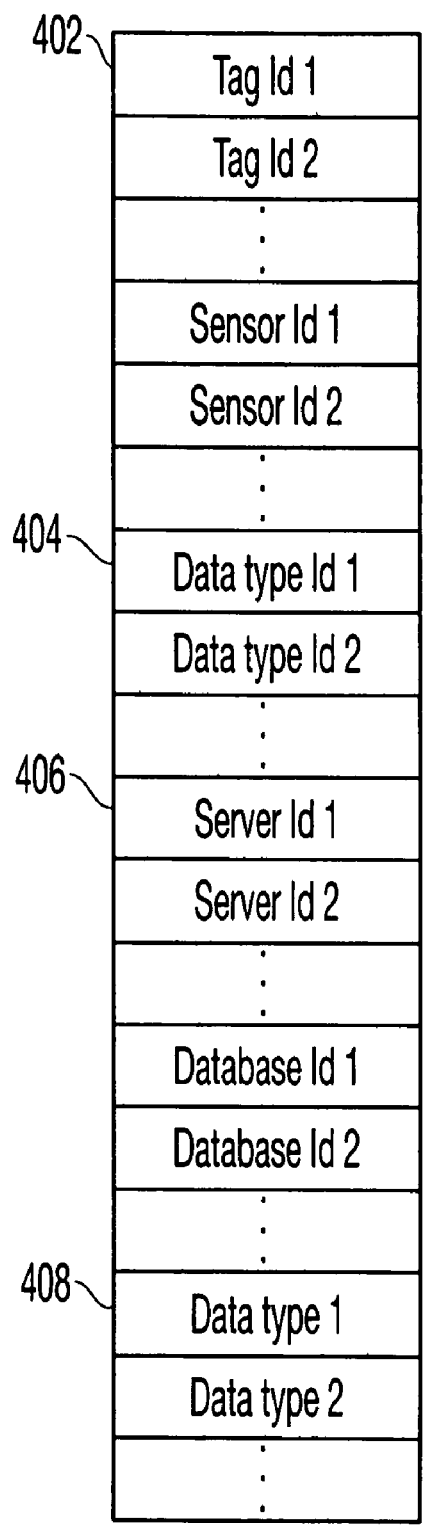
FIG. 4a displays a sample fill-out form 400 completed by a parent at a client computer 106 to control the operation of the child's tag 102.

FIG. 4a displays a sample fill-out form 400 completed by a parent at browser software 108 or elsewhere to control the operation of the child's tag 102. The fill-out form may contain one or more of the following fields:

Authorized Components For Receipt Table 402: This field specifies the components (i.e, tags, sensors, etc.) from which the child's tag may receive data.

Authorized Data For Receipt Table 404: This field specifies the types of data (i.e, data identifying the people associated with the tags 102 with which the child came into contact, test scores, teacher notes, environmental data, location data, etc.) that the child's tag 102 may receive.

Authorized Components For Transmission Table 406: This field specifies the components (i.e, database 110, etc.) to which the child's tag may transmit data.

Authorized Data For Transmission 408: This field specifies the types of data that the child's tag 102 may transmit.

Figure 4B:
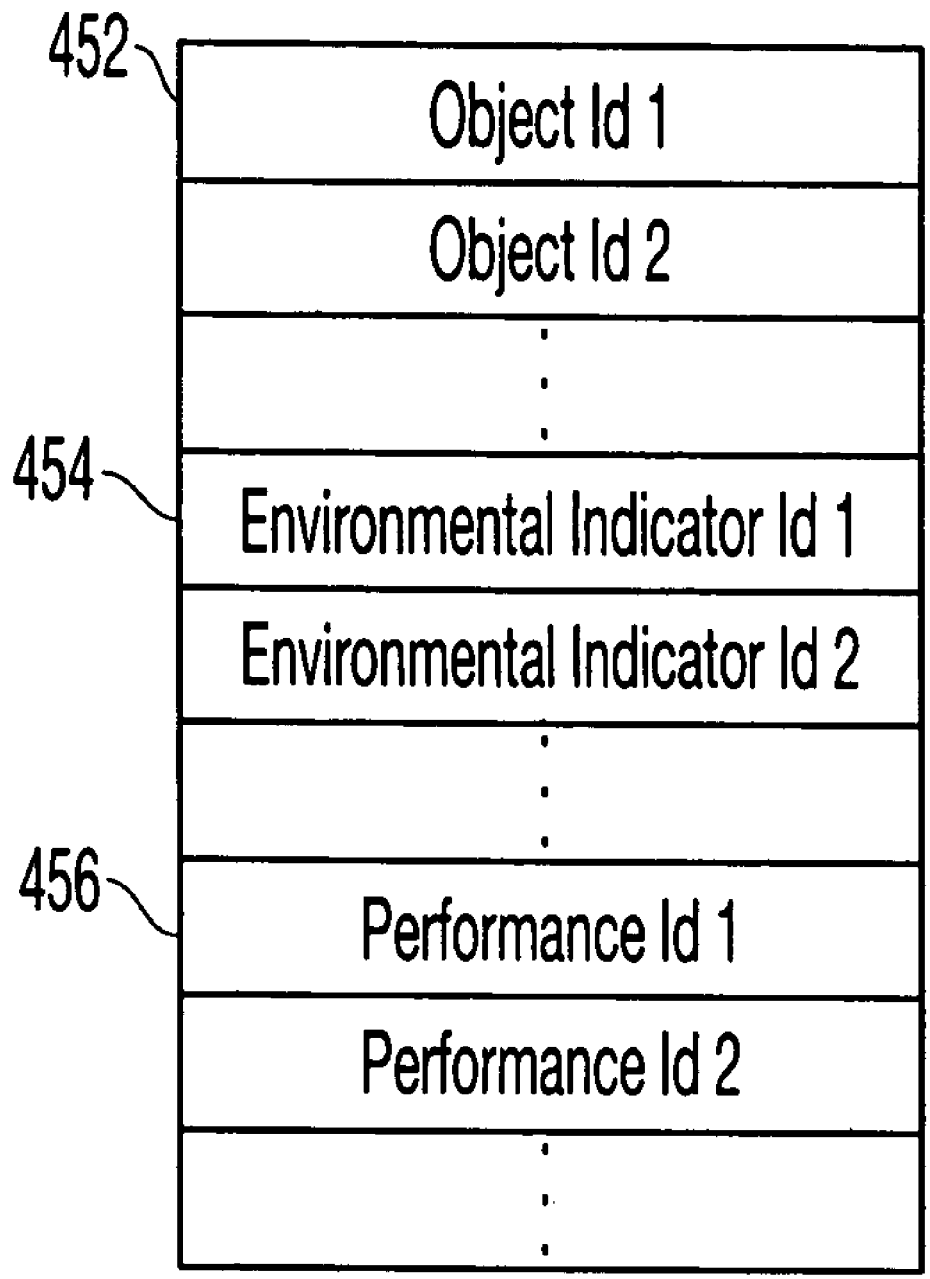
FIG. 4b displays a sample fill-out form 450 completed by a parent at a client computer 106 to retrieve data from the child's tag 102 or from a database 110.

FIG. 4b displays a sample fill-out form 450 completed by a parent at browser software 108 or elsewhere to retrieve data from the child's tag 102 or from a database 110. The fill-out form may contain one or more of the following fields:

Identification Query 452: This field requests the identify of the tagged objects such as people and animals that came into contact with the child.

Environmental Query 454: This field requests the content of the water and air to which the child had contact.

Performance Query 456: This field requests data on the child's behavior, academic performance, and athletic performance.

The present invention may be used to authenticate objects such as valuable items, sports memorabilia, and evidence. A vendor may associate a tag 102 to a valuable item such as a diamond or painting by any means such as by physically attaching or implanting the tag 102 on the item. From browser software 108 or elsewhere, a vendor may transmit control data to the object's tag 102 to indicate that the tag 102 should accept data from other tags 102 identifying the people associated with the other tags 102, sensors 104 such as global positioning system (GPS) satellites identifying the object's location throughout the day or environmental sensors 104 identifying the content of the air or water (i.e, toxins) to which the object is exposed. The tag 102 on the object executes the process for the storage of data in tags 102 illustrated by the flow diagram of FIG. 2 in order to analyze and store the control information sent by the vendor. At a subsequent time, the vendor can transmit one or more queries from browser software 108 or elsewhere to learn the identity of the people that handled the object, the quality of the air and water to which the object was exposed, the object's movements, the chain of title, the chain of possession, and the identity of the object's manufacturers, retailers, and distributors. The tag 102 associated with the object executes the process for transmitting data from the object's tag 102 illustrated by the flow diagram of FIG. 3 in order to respond to the vendor's query.

The vendor may, in the alternative, transmit additional control data to the object's tag 102 from browser software 108 or elsewhere instructing the object's tag 102 to periodically transmit data from the tag 102 to a database 110. At any subsequent time, the vendor may transmit one or more queries from browser software 108 or elsewhere to the database 110 to learn information about the object.

Another embodiment of the invention performs proximity tracking. In this embodiment, an event may be recorded within a tag when it comes within a range of other tags. These recorded events may be later sent to a database. This embodiment may be used generally to track the objects that have come into proximity with another object. For example, this embodiment may be used to track the people that have come into contact with a child or the places where a child has been. This embodiment may also be used to track the movement of objects with respect to locations within a secure facility.

In one embodiment, the tags may contain one or more of the following: a radio transmitter, a radio receiver, a memory, control software, a processor and a clock. The memory may include a RAM and a ROM. The control software may be stored in the ROM. The processor may be of a type that consumes less power.

The tags may contain one or more data structures including a tag identifier, a tag identifier map and a time field. The tag identifier may be a variable length string of up to 255 bytes and may be used to distinguish tags from each other. The tag identifier map may map a tag identifier to a public key and a counter. In one embodiment, the tag identifier map is implemented with a hash table. In another embodiment, the tag identifier is implemented with a binary search tree. The tag identifier map may be initialized with the public keys of certain tags such as those that are expected to be encountered and/or those that are determined to be sensitive. This scheme enables tags to quickly discard messages from tags with invalid signatures. Entries in the tag identifier map may be discarded after the map becomes full. Entries may be discarded in any order such as first-in-first-out (FIFO), least recently used (LRU), etc. The time field may be a four byte unsigned integer and may contain the current time in any form such as Greenwich Mean Time (GMT).

Figure 5:
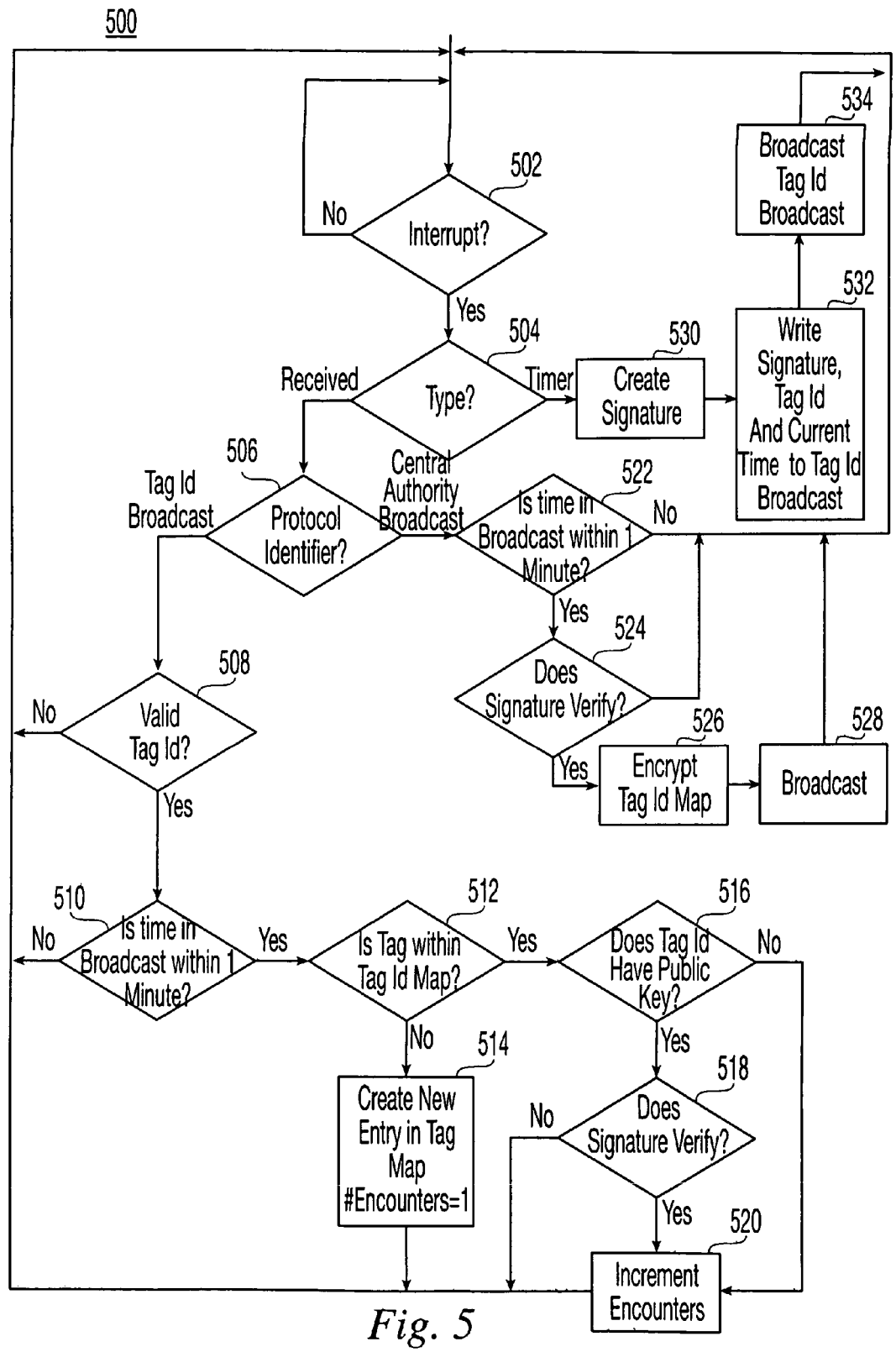
FIG. 5 is a data flow diagram 500 illustrating the operation of one embodiment of a tag for proximity checking.

FIG. 5 is a data flow diagram 500 illustrating the operation of one embodiment of a tag for proximity checking. The tag waits for an interrupt in step 502. In step 504, the type of interrupt is determined. If the interrupt is a received interrupt, control proceeds to step 506. In step 506, the protocol identifier of the received broadcast is determined. The protocol identifier may be of different types such as a tag-identifier broadcast, a tag identifier map broadcast, etc. Exemplary formats of the tag-identifier broadcast, the central authority broadcast and the tag identifier map broadcast are shown in FIGS. 6a, 6b, and 6c respectively. The broadcasts may be encapsulated in a wireless broadcast packet at the network-interface layer and multi-byte values may be transmitted in big endian order. The signatures may be RSA signatures. The signature in the tag identifier broadcast may be taken over the tag identifier and current time fields. The signature in the central authority broadcast may be taken over the current time field. One or more of the fields excluding the protocol identifier in the tag identifier map broadcast may be encrypted with the public key of the central authority. The signature in the tag identifier may be taken over one or more of the fields following the current time.

If the protocol identifier is a tag identifier broadcast, control proceeds to step 508. In step 508, the tag identifier of the tag identifier broadcast is checked to determine if it is valid. If it is not valid, the broadcast is ignored and control returns to step 502. If it is valid, control proceeds to step 510. In step 510, the time in the tag identifier broadcast is checked to determine whether it is within one minute of the current time. If it is not, then the broadcast is ignored and control returns to step 502. If it is, then control proceeds to step 512. In step 512, the tag identifier in the tag identifier broadcast is checked to determine whether it is present in the tag identifier map (i.e., has been previously encountered by the tag). If not, control proceeds to step 514. In step 514, a new entry is created for the tag identifier in the tag identifier map and the number of encounters for that entry is set to one. Control then proceeds to step 502.

If the tag identifier is determined to be present in the tag identifier map in step 512, then control proceeds to step 516. In step 516, it is determined whether the tag identifier in the tag identifier broadcast has a public key. If so, then control passes to step 518. In step 518, the public key is used to verify the signature. If the signature verification in step 518 is not successful, then the broadcast is ignored and control returns to step 502. If the signature verification in step 518 is successful, then control proceeds to step 520. In step 520, the number of encounters for the tag identifier in the tag identifier map is incremented.

If the protocol identifier is determined to be a central authority broadcast in step 506, then control proceeds to step 522. In step 522, the time in the central authority broadcast is checked to determine if it is within one minute of the current time. If not, then the broadcast is ignored and control returns to step 502. If so, control proceeds to step 524. In step 524, the public key of the central authority is used to verify the signature in the central authority broadcast. If the signature verification is not successful, then the broadcast is ignored and control returns to step 502. If the signature verification in step 524 is successful, then control proceeds to step 526. In step 526, the tag identifier map is encrypted with the central authority public key. In step 528, the encrypted tag identifier map is broadcast. Control then returns to step 502.

If the interrupt is determined to be a timer interrupt in step 504, control proceeds to step 530. In one embodiment, the timer interrupt occurs every 15 seconds. In step 530, the signature is created using the tag's private key. In step 532, the signature, the tag identifier, and the current time are written to the tag identifier broadcast. In step 534, the tag identifier broadcast is broadcast. Control then returns to step 502.

The embodiment of FIG. 5 has a number of advantages. The signature makes it infeasible for any preregistered tag to spoof a real tag. Replay attacks are blocked by the time stamp.

The private keys may be secured; the central authority may be in a secure location; and the tags may be tamper-resistant. These options prevent one tag from repudiating contact with another tag. A replacement strategy may be used to prevent attempts to flood the tag identifier map by broadcasting of spurious tag identifiers. In another embodiment, a global public/private key pair may be used to authenticate broadcasts.

Another embodiment of the invention sounds an alarm within a predetermined time if a tag goes outside a particular range of one or more other tags. In one embodiment, the range is a mutual transmit/receive range. In one embodiment the predetermined time is sixty seconds. One tag may be physically attached to a sensitive object that must not leave a secure area. The other tag may be built into a secure, immobile location such as a floor or ceiling or may be carried by authorized personnel. In one embodiment, a protocol enables and disable tags so that objections can be removed by authorized parties.

This embodiment may be used to alert security personnel to the movement of objects out of a secure facility, to alert employees to theft of inventory from a store, to alert a parent or day-care provider to a child that strays outside of a certain area, to alert a person to the theft of a motor vehicle, or to the theft of valuable objects from the home, to alert a escort in a secure facility of abandonment by a guest, to alert the authorities of the escape of a criminal from prison or from a house for those criminals under house arrest, etc.

In one embodiment, the tags may contain one or more of the following: a radio transmitter, a radio receiver, a memory, control software, a processor, a clock and an audible alarm. The memory may include a RAM and a ROM. The control software may be stored in the ROM. The processor may be of a type that consumes less power.

The tags may contain one or more data structures including a tag identifier, a tag identifier of a partner tag, a private key for the tag, a public key for the partner tag, a public key of a control authority, an alarm counter, an enable flag and a time field. The tag identifier may be a variable length string of up to 255 bytes and may be used to distinguish tags from each other. The tag identifier of the partner tag may be a variable length string of up to 255 bytes. The private and public keys may be 16 bytes. The alarm counter may be four bytes. The enable flag may be four bytes. The time field may be a four byte unsigned integer and may contain the current time in any form such as Greenwich Mean Time (GMT).

Figure 7:
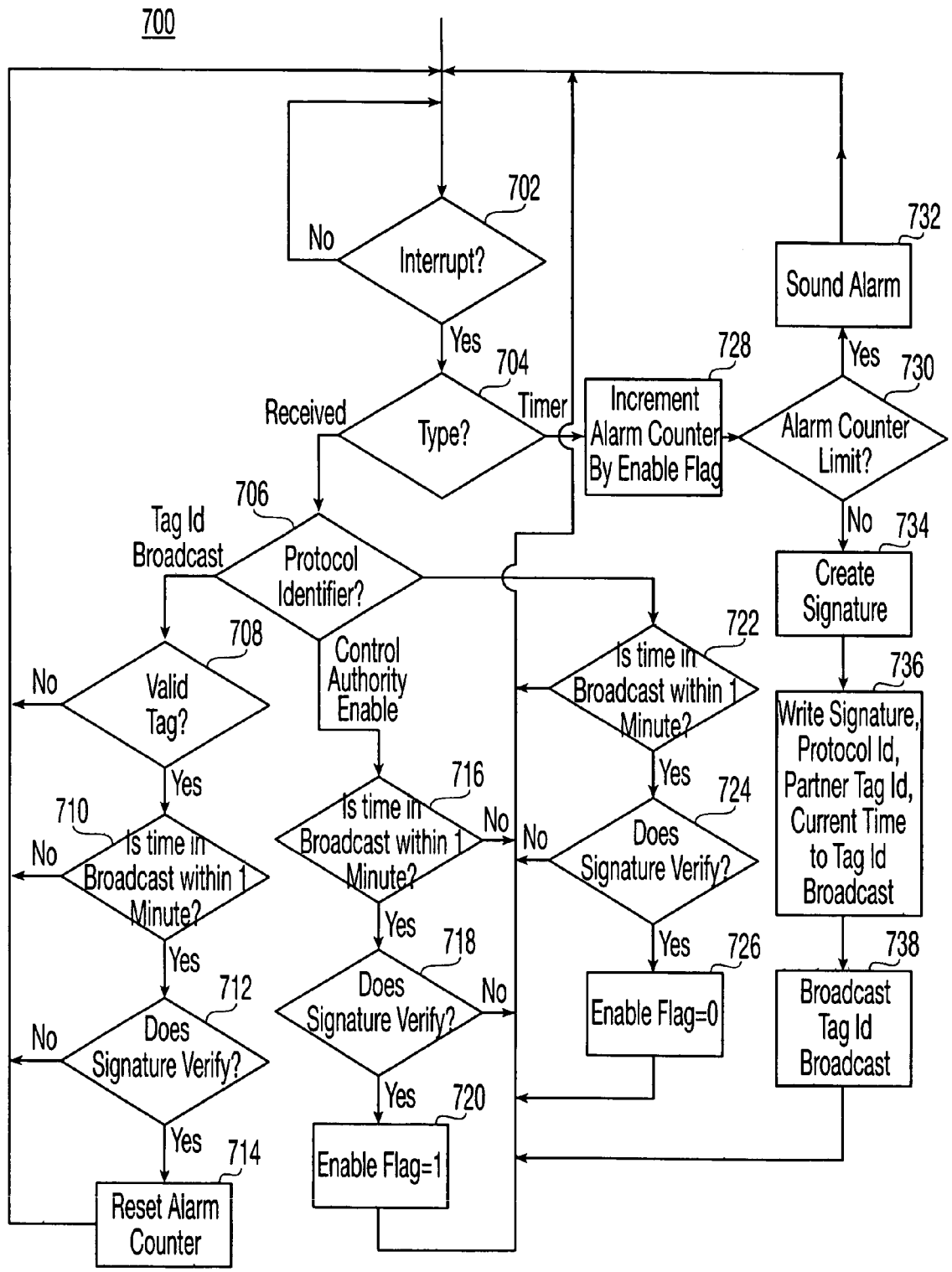
FIG. 7 is a data flow diagram illustrating the operation of one embodiment of a tag for an out-of-proximity alarm.

FIG. 7 is a data flow diagram 700 illustrating the operation of one embodiment of a tag for an out-of-proximity alarm. The tag waits for an interrupt in step 702. In step 704, the type of interrupt is determined. If the interrupt is a received interrupt, control proceeds to step 706. In step 706, the protocol identifier of the received broadcast is determined. The protocol identifier may be of different types such as a tag-identifier broadcast, a control-authority broadcast (including a control authority enable and a control authority disable), etc. Exemplary formats of the tag-identifier broadcast, the control authority enable and the control authority disable are shown in FIGS. 8a and 8b respectively. The broadcasts may be encapsulated in a wireless broadcast packet at the network-interface layer and multi-byte values may be transmitted in big endian order. The signature in the tag identifier broadcast may be taken over the tag identifier and current time fields. The signature in the control-authority broadcast may be taken over the current time field. The signatures may be RSA signatures.

If the protocol identifier is a tag identifier broadcast, control proceeds to step 708. In step 708, the tag identifier of the tag identifier broadcast is checked to determine if it is valid. If it is not valid, the broadcast is ignored and control returns to step 702. If it is valid, control proceeds to step 710. In step 710, the time in the tag identifier broadcast is checked to determine whether it is within one minute of the current time. If it is not, then the broadcast is ignored and control returns to step 702. If it is, then control proceeds to step 712. In step 712, the public key of a partner tag may be used to verify the signature in the tag-identifier broadcast. If the signature verification in step 712 is not successful, then the broadcast is ignored and control returns to step 702. If the signature verification in step 712 is successful, then control proceeds to step 714. In step 714, the alarm counter is reset to zero.

If the protocol identifier is determined to be a control authority enable broadcast in step 706, then control proceeds to step 716. In step 716, the time in the control authority enable broadcast is checked to determine if it is within one minute of the current time. If not, then the broadcast is ignored and control returns to step 702. If so, control proceeds to step 718. In step 718, the public key of the control authority is used to verify the signature in the control authority enable broadcast. If the signature verification is not successful, then the broadcast is ignored and control returns to step 702. If the signature verification in step 718 is successful, then control proceeds to step 720. In step 720, the enable flag is set to one. Control then returns to step 702.

If the protocol identifier is determined to be a control authority disable broadcast in step 706, then control proceeds to step 722. In step 722, the time in the control authority disable broadcast is checked to determine if it is within one minute of the current time. If not, then the broadcast is ignored and control returns to step 702. If so, control proceeds to step 724. In step 724, the public key of the control authority is used to verify the signature in the control authority enable broadcast. If the signature verification is not successful, then the broadcast is ignored and control returns to step 702. If the signature verification in step 724 is successful, then control proceeds to step 726. In step 726, the enable flag is set to zero. Control then returns to step 702.

If the interrupt is determined to be a timer interrupt in step 704, control proceeds to step 728. In one embodiment, the timer interrupt occurs every six seconds. In step 728, the enable flag is added to the alarm counter. In step 730 the alarm counter is checked to determine if it is greater than a limit. In one embodiment, the limit may be 10 seconds. If the alarm counter is greater than the limit, control proceeds to step 732. In step 732, the tag sounds an alarm. Control then proceeds to step 702.

If the alarm counter is determined to be less than or equal to the limit in step 730, then control proceeds to step 734. In step 734, a signature is created using the tag's private key. In one embodiment, the signature is taken over the tag identifier of a partner and the current time. In step 736, the signature, the protocol identifier, the tag identifier of a partner, and the current time are written to the tag identifier broadcast. In step 738, the tag identifier broadcast is broadcast. Control then returns to step 702.

The embodiment of FIG. 7 has a number of advantages. The signature makes it infeasible for a phony partner tag to spoof a real tag. The signature also makes it infeasible for a phony control authority to disable a tag. Replay attacks are blocked by the time stamp. Destroying a tag sounds the alarm of a partner tag.

Another embodiment of the invention sounds an alarm if a tag comes within a particular range of one or more other tags. Each tag may maintain a sensitive tag list of such other tags that cause its alarm to sound. In one embodiment, the range is a mutual transmit/receive range. One tag may be physically attached to a sensitive object that must not enter a secure area. The other tag may be built into a secure, immobile location such as a floor or ceiling or may be carried by authorized personnel. This embodiment may include a protocol for adding tags to and deleting tags from the sensitive tag list.

This embodiment may be used to alert security personnel to the movement of objects such as dangerous or hazardous object into a sensitive facility, to alert employees to inventory that is being carried near the exit of a store, to alert a parent or child-care provider to the movement of a child toward a dangerous area or to designated persons, to warn a pedestrian who is approaching a hazardous area, to warn a motor-vehicle driver who is approaching hazardous conditions, to alert security personnel to visitors who are entering or approaching a restricted area, etc.

In one embodiment, the tags may contain one or more of the following: a radio transmitter, a radio receiver, a memory, control software, a processor, a clock and an audible alarm. The memory may include a RAM and a ROM. The control software may be stored in the ROM. The processor may be of a type that consumes less power.

The tags may contain one or more data structures including a tag identifier, a private key for the tag, a public key of a control authority, a tag identifier map, and a time field. The tag identifier may be a variable length string of up to 255 bytes and may be used to distinguish tags from each other. The private and public keys may be 16 bytes. The tag identifier map may map a sensitive tag identifier to a public key. The tag identifier map may be implemented by a hash table or a binary search tree. Entries in the tag identifier map may expire in least-recently-used order if the tag identifier map becomes full. The time field may be a four byte unsigned integer and may contain the current time in any form such as Greenwich Mean Time (GMT).

Figure 9:
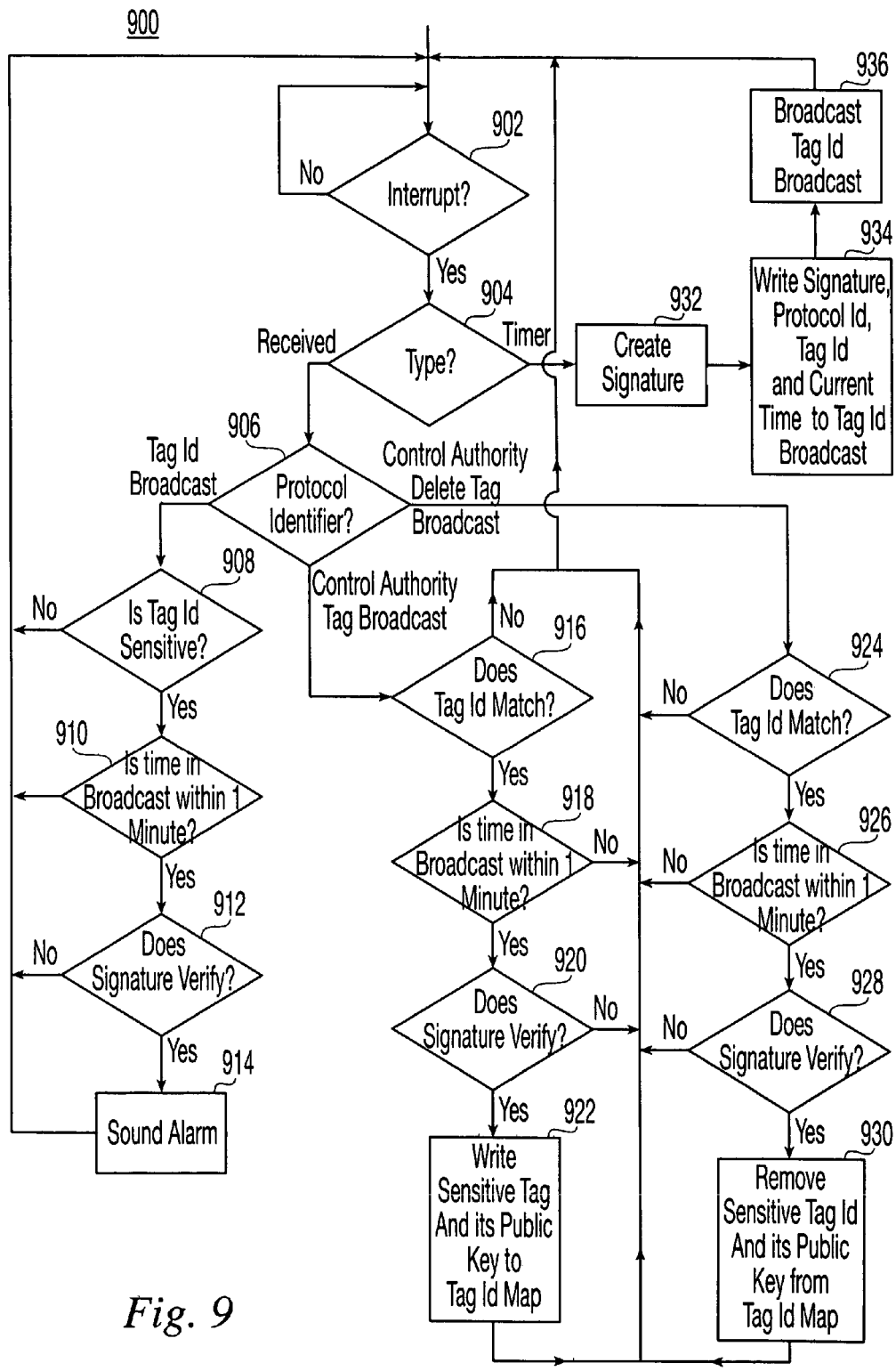
FIG. 9 is a data flow diagram illustrating the operation of one embodiment of a tag for a symmetric proximity alarm.

FIG. 9 is a data flow diagram 900 illustrating the operation of one embodiment of a tag for a symmetric proximity alarm. The tag waits for an interrupt in step 902. In step 904, the type of interrupt is determined. If the interrupt is a received interrupt, control proceeds to step 906. In step 906, the protocol identifier of the received broadcast is determined. The protocol identifier may be of different types such as a tag-identifier broadcast, a control-authority add tag broadcast, a control authority delete tag broadcast, etc. Exemplary formats of the tag-identifier broadcast, the control authority add tag broadcast and the control authority delete tag broadcast are shown in FIGS. 10a, 10b, and 10c respectively. The broadcasts may be encapsulated in a wireless broadcast packet at the network-interface layer and multi-byte values may be transmitted in big endian order. The signatures may be RSA signatures. The signature in the tag identifier broadcast may be taken over the tag identifier and current time fields. The signature in the control-authority add tag broadcast may be taken over the target tag identifier, the sensitive tag identifier, the sensitive tag public key and the current time field. The signature in the control-authority delete tag broadcast may be taken over the target tag identifier, the sensitive tag identifier, and the current time field.

If the protocol identifier is a tag identifier broadcast, control proceeds to step 908. In step 908, the tag identifier of the tag identifier broadcast is checked to determine if it is in the tag's list of sensitive tags. If it is not in the list of sensitive tags, the broadcast is ignored and control returns to step 902. If it is in the list of sensitive tags, control proceeds to step 910. In step 910, the time in the tag identifier broadcast is checked to determine whether it is within one minute of the current time. If it is not, then the broadcast is ignored and control returns to step 902. If it is, then control proceeds to step 912. In step 912, the public key of the tag identifier in the tag identifier broadcast may be used to verify the signature in the tag-identifier broadcast. If the signature verification in step 912 is not successful, then the broadcast is ignored and control returns to step 902. If the signature verification in step 912 is successful, then control proceeds to step 914. In step 914, the alarm sounds.

If the protocol identifier is determined to be a control authority add tag broadcast in step 906, then control proceeds to step 916. In step 916, the target tag identifier is checked to determine if it matches the tag identifier of the tag receiving the broadcast. If there is not a match, the broadcast is ignored and control returns to step 902. If there is a match, control proceeds to step 918. In step 918, the time in the control authority add tag broadcast is checked to determine if it is within one minute of the current time. If it is not, then the broadcast is ignored and control returns to step 902. If it is within one minute, control proceeds to step 920. In step 920, the public key of the control authority is used to verify the signature in the control authority add tag broadcast. If the signature verification is not successful, then the broadcast is ignored and control returns to step 902. If the signature verification in step 920 is successful, then control proceeds to step 922. In step 922, the sensitive tag identifier in the control authority add tag broadcast and its public key are stored in the tag identifier map. Control then returns to step 902.

If the protocol identifier is determined to be a control authority delete tag broadcast in step 906, then control proceeds to step 924. In step 924, the target tag identifier is checked to determine if it matches the tag identifier of the tag receiving the broadcast. If there is not a match, the broadcast is ignored and control returns to step 902. If there is a match, control proceeds to step 926. In step 926, the time in the control authority delete tag broadcast is checked to determine if it is within one minute of the current time. If it is not, then the broadcast is ignored and control returns to step 902. If it is within one minute, control proceeds to step 928. In step 928, the public key of the control authority is used to verify the signature in the control authority delete tag broadcast. If the signature verification is not successful, then the broadcast is ignored and control returns to step 902. If the signature verification in step 928 is successful, then control proceeds to step 930. In step 930, the sensitive tag identifier in the control authority delete tag broadcast and its public key are removed from the tag identifier map. Control then returns to step 902.

If the interrupt is determined to be a timer interrupt in step 904, control proceeds to step 932. In one embodiment, the timer interrupt occurs every fifteen seconds. In step 932, a signature is created using the tag's private key. In one embodiment, the signature is taken over the tag identifier and the current time. In step 934, the signature, the protocol identifier, the tag identifier, and the current time are written to the tag identifier broadcast. In step 936, the tag identifier broadcast is broadcast. Control then returns to step 902.

The embodiment of FIG. 9 has a number of advantages. The signature makes it infeasible for a phony sensitive tag to spoof a real tag. The signature also makes it infeasible for a phony control authority to add or delete a tag. Replay attacks are blocked by the time stamp. Tags may be made to be resistant to tampering to lessen their vulnerability to physical destruction or removal.

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A system for storing, retrieving and managing data for one or more objects comprising:
   one or more tags associated with the one or more objects, at least one of the tags comprising control software and a processor operative to execute the control software, the at least one tag operative to receive and transmit data, the data pertaining to (1) the object associated with the at least one tag, (2) operation of the at least one tag, or (3) both;
   one or more components communicating with at least one of said tags; and
   at least one communication network for facilitating said communicating among said components and said tags;
   wherein:
   the processor is operative to process data pertaining to the operation of the at least one tag and to program the at least one tag to receive data from other said tags; and
   at least one of said components transmits at least one query to receive at least a portion of said data about said object associated with said at least one tag.

2. A system for storing, retrieving, and managing data for one or more objects as in claim 1 wherein said data for said associated object comprises one or more members of the set consisting of: the identity of people that came into contact with said associated object, at least one measurement of at least one environmental condition to which said associated object was exposed, the academic performance of said object, the athletic performance of said object, at least one measurement of the medical condition of said object, authentication data for said object, the price history of said object, and the movement of said object.

3. A system for storing, retrieving, and managing data for one or more objects as in claim 1 wherein said one or more components comprises:
   at least one database for receiving said data from said at least one tag and for managing said data.

4. A system for storing, retrieving and managing data for one or more objects as in claim 1 wherein said data specifies at least one of said one or more components from which said at least one tag may receive data.

5. A system for storing, retrieving and managing data for one or more objects as in claim 1 wherein said data specifies one or more data types that said at least one tag is authorized to receive.

6. A system for storing, retrieving and managing data for one or more objects as in claim 1 wherein said one or more components comprises one or more members of the set consisting of a client computer, a database, a server computer, an input utility, and a sensor.

7. A system for storing, retrieving and managing data for one or more objects as in claim 1 wherein said one or more tags are micro-devices that transmit and receive radio-frequency signals.

8. A method for storing, retrieving and managing data for one or more objects comprising:
   associating one or more tags with the one or more objects;
   communicating with at least one of said tags from one or more components;
   communicating with at least one of said tags from another of said tags;
   receiving control data and information data from at least one of said components into at least one of said tags wherein said information data is in addition to a tag identifier and is about the object that is associated with said at least one tag;
   transmitting at least a portion of said information data from said at least one tag to at least one of said components in accordance with said control data; and
   transmitting from said at least one of said components at least one query to receive at least a portion of said information data about said object associated with said at least one tag.

9. A method for storing, retrieving, and managing data for one or more objects as in claim 8 wherein said information data for said associated object comprises one or more members of the set consisting of: the identity of people that came into contact with said associated object, at least one measurement of at least one environmental condition to which said associated object was exposed, the academic performance of said object, the athletic performance of said object, at least one measurement of the medical condition of said object, authentication data for said object, the price history of said object, and the movement of said object.

10. A method for storing, retrieving, and managing data for one or more objects as in claim 8 further comprising:
    receiving said information data from said at least one tag; and
    managing said information data.

11. A method for storing, retrieving and managing data for one or more objects as in claim 8 wherein said control data specifies at least one of said one or more components from which said at least one tag may receive data.

12. A method for storing, retrieving and managing data for one or more objects as in claim 8 wherein said control data specifies one or more data types that said at least one tag is authorized to received.

13. A method for storing, retrieving, and managing data for one or more objects as in claim 8 wherein said one or more components comprises one or more members of the set consisting of a client computer, a database, a server computer, an input utility, and a sensor.

14. A method for managing one or more children comprising:
    associating one or more tags with the one or more children;
    transmitting control data to said one or more tags;
    sensing information data by said one or more tags in accordance with said control data, said information data comprising one or more of at least one measurement of at least one environmental condition to which the one or more children were exposed or at least one measurement of the medical condition of the one or more children;
    storing said sensed information data in said one or more tags; and
    transmitting at least a portion of said information data from said one or more tags in accordance with said control data.

15. A method for managing one or more children as in claim 14 wherein said control data specifies at least one of said one or more tags from which said at least one tag may receive data.

16. A method for managing one or more children as in claim 14 wherein said control data specifies one or more data types that said at least one tag is authorized to receive.

17. A method for managing inventory including one or more objects comprising:
    associating one or more tags with the one or more objects, the one or more tags comprising a processor, the one or more tags operative to receive control data and information data, the processor operative to process the control data to program the one or more tags in accordance with the control data, the one or more tags operative to transmit the information data or portions thereof in accordance with the control data;
    transmitting control data and information data to said one or more tags;
    receiving said information data into said one or more tags, said information data comprising one or more of the following: a location of the one or more objects, a time at which the one or more objects was at the location, the identity of people that took or released possession of the one or more objects, the identity of people that came into contact with the one or more objects, at least one measurement of at least one environmental condition to which the one or more objects were exposed, a weight of the one or more objects, a time at which the one or more objects had the weight, dimensions of the one or more objects, and a time at which the one or more objects had the dimensions;
    processing the control data to program the at least one tag to either receive information data from another tag, transmit specified information data to one or more of said components, or accept only certain types of transmitted data; and
    transmitting at least a portion of said information data from said at least one tag in accordance with said control data.

18. A method for managing inventory including one or more objects as in claim 17 further comprising receiving control data specifying at least one of the one or more tags from which said one or more tags may receive data.

19. A method for managing inventory including one or more objects as in claim 17 further comprising receiving control data specifying one or more types of data that said one or more tags is authorized to receive.

20. A method for managing inventory including one or more objects as in claim 17 further comprising:
    receiving said information data from said at least one tag; and
    managing said information data.

21. A method for managing inventory including one or more objects as in claim 17 wherein said transmitting control data and information data is performed by one or more components, said components comprising one or more members of the set consisting of a client computer, database, a server computer, an input utility, and a sensor.

22. A method for managing inventory including one or more objects as in claim 21 further comprising:

transmitting from said at least one of said components at least one query to receive at least a portion of said information data about said object associated with said at least one tag.

23. A system for managing inventory including one or more objects comprising:
   one or more tags associated with the one or more objects, at least one of the tags comprising a processor, the one or more tags operative to receive and transmit data, the data pertaining to (1) the object associated with the at least one tag, (2) operation of the at least one tag, or (3) both: and
   one or more components transmitting data to said one or more tags; wherein:
   said data comprises one or more of the following: a location of the one or more objects, a time at which the one or more objects was at the location, the identity of people that took or released possession of the one or more objects, the identity of people that came into contact with the one or more objects, at least one measurement of at least one environmental condition to which the one or more objects were exposed, a weight of the one or more objects, a time at which the one or more objects had the weight, dimensions of the one or more objects, and a time at which the one or more objects had the dimensions; and
   the processor is operative to process data pertaining to the operation of the at least one tag to program the at least one tag to either receive data from another tag, transmit specified data to one or more of said components, or accept only certain types of transmitted data.

24. A system for managing inventory including one or more objects as in claim 23 wherein said data specifies at least one of the one or more tags from which said one or more tags may receive data, the at least one tag associated with a person having access to the inventory.

25. A system for managing inventory including one or more objects as in claim 23 wherein said data instructs said one or more tags to periodically transmit certain data to a particular component.

26. A system for managing inventory including one or more objects as in claim 23 wherein said components comprise one or more members of the set consisting of a client computer, a database, a server computer, an input utility, and a sensor.

27. A system for managing inventory including one or more objects as in claim 23 wherein said data comprises at least one query to receive other data about said object associated with said at least one tag.

28. A system for storing, retrieving and managing data for one or more objects as in claim 1 wherein the data comprises information data, control data, or both.

29. A system for storing, retrieving and managing data for one or more objects as in claim 1 wherein the control software programs the at least one tag to record an event when in range of other tags.

30. A system for storing, retrieving and managing data for one or more objects as in claim 1 wherein the control software programs the at least one tag to transmit data to other tags.

31. A system for storing, retrieving and managing data for one or more objects as in claim 1 wherein the control software programs the at least one tag to accept only certain types of information data from other tags and components.

32. A system for storing, retrieving and managing data for one or more objects as in claim 1 wherein the processor is operative to modify the control software in accordance with received control data.

33. A system for storing, retrieving and managing data for one or more objects as in claim 1 wherein at least one of the one or more objects is a person, real property, or personal property.

34. A method for storing, retrieving and managing data for one or more objects as in claim 8 wherein said communicating with at least one of said tags from one other of said tags is controlled by software stored in a memory and executed by a processor of one of said tags.

35. A method for storing, retrieving and managing data for one or more objects as in claim 8 wherein said associating comprises attaching one or more tags to the one or more objects.

36. A method for storing, retrieving and managing data for one or more objects as in claim 14 wherein said associating comprises attaching one or more tags to clothing worn by the one or more children.

37. A system for managing inventory including one or more objects as in claim 23 wherein the data comprises information data, control data, or both.

* * * * *

UNITED STATES PATENT AND TRADEMARK OFFICE
CERTIFICATE OF CORRECTION

PATENT NO. : 7,388,488 B2  
APPLICATION NO. : 10/952789  
DATED : June 17, 2008  
INVENTOR(S) : Peter Lupoli et al.

Page 1 of 1

It is certified that error appears in the above-identified patent and that said Letters Patent is hereby corrected as shown below:

In the Specification

Figure 3A:
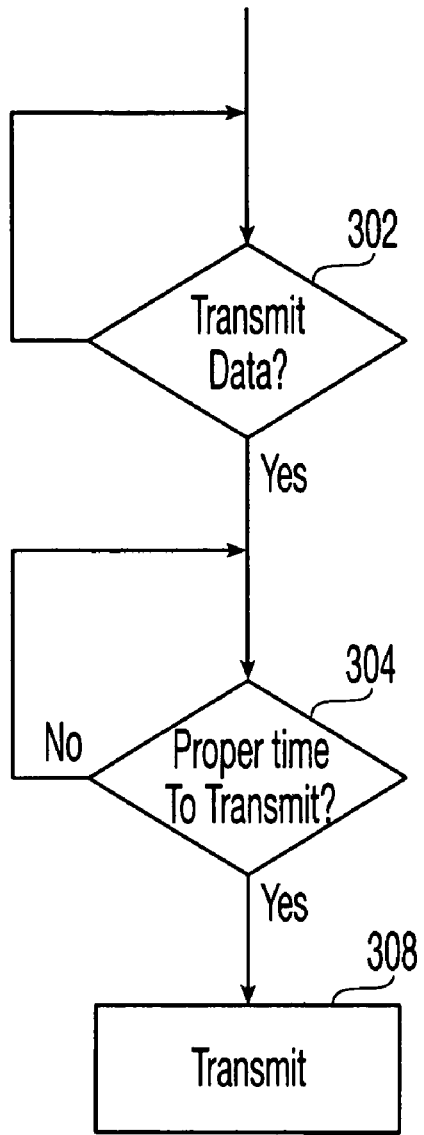
FIG. 3 is a dataflow diagram describing the transmission of data from tags 102.
Figure 3B:
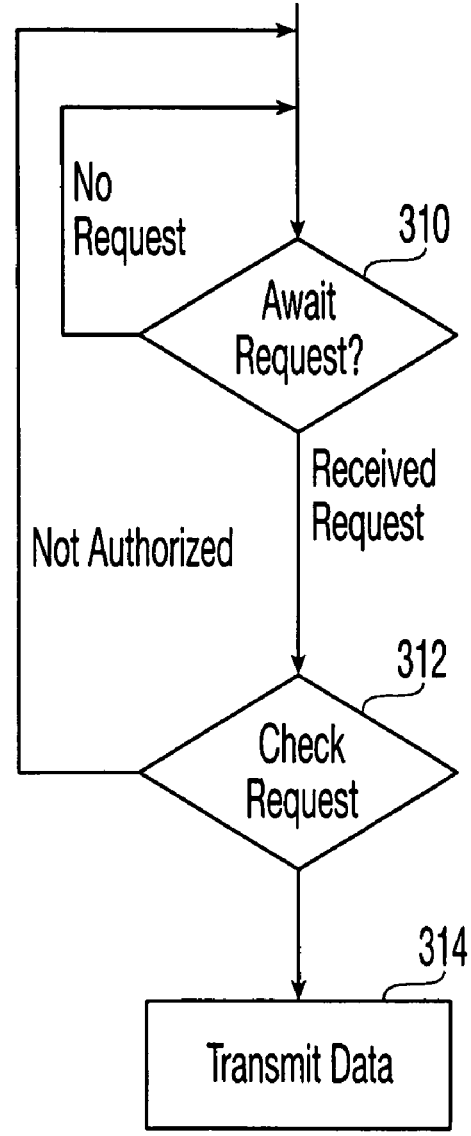

Column 3, line 55, "FIG. 3 is a dataflow diagram" should be changed to --FIGS. 3a and 3b are dataflow diagrams--.

Column 8, line 20, "FIG. 3 is a dataflow diagram 300" should be changed to --FIGS. 3a and 3b are dataflow diagrams--.

Column 9, line 19 and column 10, line 15, each occurrence, "diagram" should be changed to --diagrams--.

Column 9, line 19 and column 10, line 15, each occurrence, "FIG. 3" should be changed to --FIGS. 3a and 3b--.

Signed and Sealed this  
Twenty-sixth Day of November, 2013

Margaret A. Focarino  
*Commissioner for Patents of the United States Patent and Trademark Office*